United States Patent
Sinn et al.

[11] 3,752,623
[45] Aug. 14, 1973

[54] APPARATUS FOR PRODUCTION OF POLYAMIDE MOLDINGS

[75] Inventors: Richard Sinn, Ludwigshafen; Rolf Schellenberg, Mannheim, both of Germany

[73] Assignee: Badische Anilin- & Soda-Fabrik Aktiengesellschaft, Ludwigshafen/Rhein, Germany

[22] Filed: July 14, 1971

[21] Appl. No.: 163,406

Related U.S. Application Data

[63] Continuation of Ser. No. 803,299, Feb. 28, 1969, abandoned.

[52] U.S. Cl. ............... 425/206, 260/78 L, 264/37, 264/331, 425/4
[51] Int. Cl. ...... B29b 1/04, B29b 5/02, C08g 20/12
[58] Field of Search ............ 264/331, 216, DIG. 56, 264/37, 40; 260/78 L; 23/283, 285; 425/130, 145, 4, 206, 257, 248, 217, 215

[56] References Cited
UNITED STATES PATENTS

| | | |
|---|---|---|
| 3,494,999 | 2/1970 | Heckrotte .......................... 264/329 |
| 2,862,239 | 12/1958 | Pollard et al. ........................ 264/40 |
| 2,644,195 | 7/1953 | Bennes et al. ......................... 264/37 |
| 3,505,448 | 4/1970 | Zijp et al. ............................ 264/331 |
| 3,417,178 | 12/1968 | Downing et al. .................... 264/331 |
| 3,454,689 | 7/1969 | Garrison ............................. 264/331 |

Primary Examiner—Robert F. White
Assistant Examiner—Jeffery R. Thurlow
Attorney—Johnston, Root, O'Keeffe, Keil, Thompson & Shurtleff

[57] ABSTRACT

An apparatus for the production of moldings by activated anionic polymerization of lactams in which a lactam melt containing a catalyst and a lactam melt containing an activator are separately preheated to polymerization temperature in two melt reservoirs and supplied to a control unit including a pair of valves and a vertically oriented mixing chamber, mixed therein, and forced upwardly into the mold to be filled wherein valve seats for the respective valves are in the wall of said mixing chamber.

6 Claims, 4 Drawing Figures

Patented Aug. 14, 1973
3,752,623
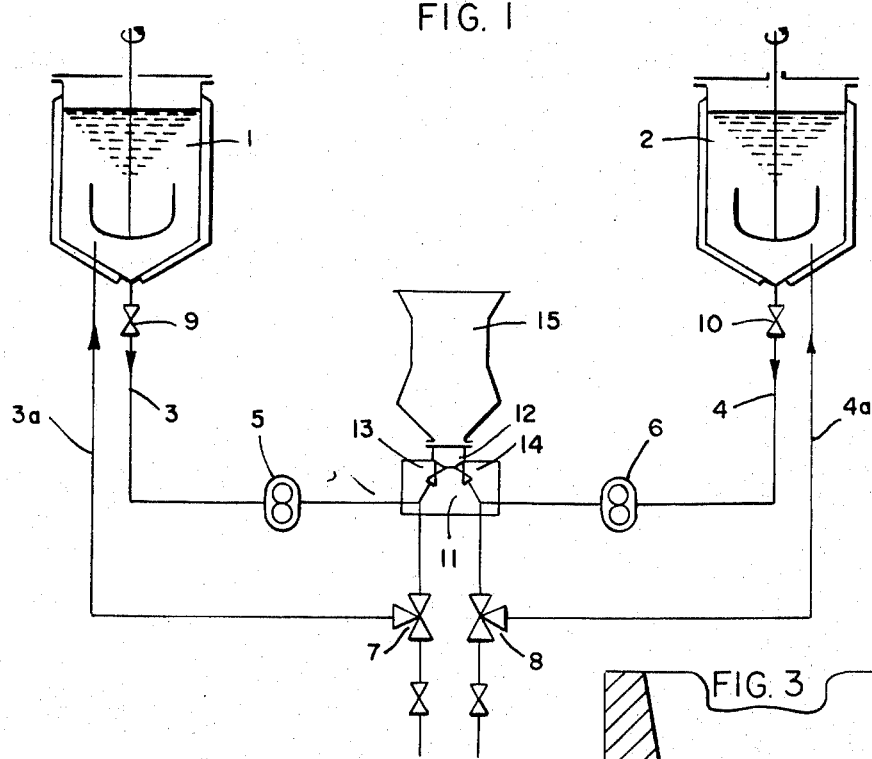
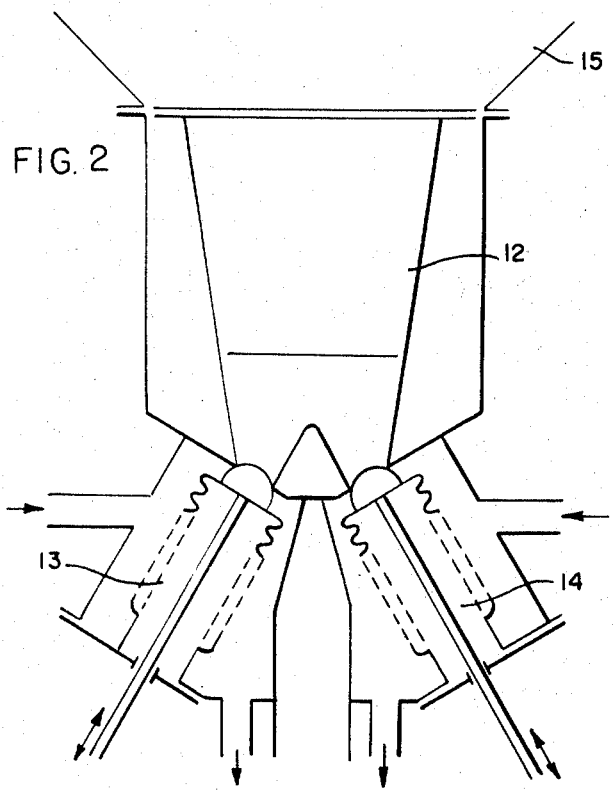
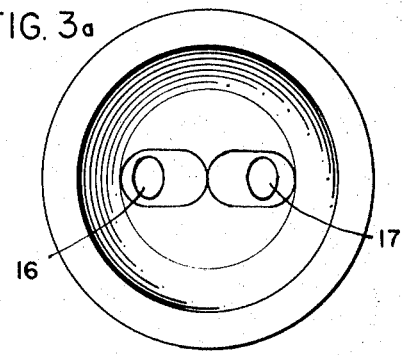
INVENTORS:
RICHARD SINN
ROLF SCHELLENBERG
BY: Johnston, Root, O'Keeffe, Keil, Thompson & Shurtleff
ATT'YS

APPARATUS FOR PRODUCTION OF POLYAMIDE MOLDINGS

This application is a continuation of U.S. Pat. application No. 803,299 filed 2/28/69, now abandoned.

This invention relates to an apparatus for the production of polyamide moldings by activated anionic polymerization of lactams in a mold.

It is known that activated anionic polymerization of lactams can be carried out in a mold by mixing catalyst and activator with the melt of the lactam to be polymerized in the mold. In this case the mixture does not need to be decanted and it solidifies to give the desired molding. This method is disadvantageous especially for the production of large and elongated moldings and for moldings having widely varying cross-sections. It is difficult to mix the catalyst and activator with the lactam to be polymerized under these conditions.

It is therefore preferred in most cases to introduce into the mold a lactam melt which already contains the catalyst and activator. The lactam melt containing the activator and catalyst may have already been heated up to polymerization temperature, or the melt may have a temperature lower than the polymerization temperature and is introduced into a mold heated to polymerization temperature.

It is also known that a lactam melt containing an activator and a lactam melt containing a catalyst can be heated separately to polymerization temperature and mixed by means of a mixing nozzle during introduction into the mold.

All these methods have disadvantages. A lactam melt containing catalyst and activator can only be kept for a short time even at temperatures below polymerization temperature. Such a mixture therefore has to be process very rapidly. However, air bubbles are readily introduced into the mold during the molding process and these result in faults (known as bubbles) in the moldings.

It has therefore been proposed to introduce the lactam melt to be polymerized into the mold by means of a feed tube, the lower end of the feed tube extending into the mold beneath the surface of the lactam melt to be polymerized and if necessary being provided with deflectors to prevent too marked an eddying of the melt which has already been introduced into the mold. It is a disadvantage of this method that residues of polymerizing lactam mixture remain in the feed tube, polymerize therein and eventually clog the feed tube.

Even such pieces of apparatus do not entirely preclude the possibility of air bubbles passing into the polymerizing melt.

We have now found that bubble-free polyamide moldings can be prepared by activated anionic polymerization of lactams in a mold without the said disadvantages by heating to polymerization temperature a lactam melt containing catalyst and a lactam melt containing activator separately, uniting the lactam melts and allowing them to polymerize in a mold by a method in which the melt containing catalyst and the melt containing activator are simultaneously supplied to a mixing zone, united therein and forced from the mixing zone upwardly into the mold to be filled.

Apparatus for carrying out the process may therefore be as shown diagrammatically in the drawings and may comprise two reservoirs 1 and 2 each provided with means for heating and cooling and for mixing the contents, lines 3 and 4 capable of being heated and provided with pumps 5 and 6 and leading to a control unit 11 and a mixing chamber 12 separated by valves 13 and 14 from lines 3 and 4, and a mold 15 located directly above the control unit 11.

In a particularly advantageous embodiment of this apparatus, the heatable lines 3 and 4 are designed as ring mains 3 and 3a and 4 and 4a in each of which a control valve 7, 8 is located.

Bubble-free rods and moldings of any cross-section and particularly moldings having intricate shapes can be produced by activated anionic polymerization of lactams by the said method and with the said apparatus.

FIG. 1 is a diagrammatic view of the apparatus according to this invention. The apparatus comprises two reservoirs 1 and 2 provided with means for heating and cooling and means for mixing the contents, for example stirred vessels capable of being heated and cooled. To each of the reservoirs there is connected a heatable ring main 3, 3a or 4, 4a, each having a heatable pump 5 or 6 and a control valve 7 or 8. If necessary, other valves may be provided in the ring mains which will permit partial emptying of the apparatus, for example for repairs. Commercially available pumps such as gear pumps, centrifugal pumps, diaphragm pumps or piston pumps may be used as the heatable pumps 5 and 6 in the ring mains 3,3a and 4,4a.

The valves 7, 8, 9 and 10 in the ring mains 3, 3a and 4, 4a may be cone valves, ball valves, diaphragm valves or valves operated by spring or gas pressure and which automatically open when a certain pressure is reached in the line.

Complete removal of air from the system is possible by the provision of ring mains and valves so that the lactam melt can be constantly pumped in circulation without the slightest trace of air bubbles.

Both ring mains communicate with the chamber referred to as the control unit 11 which consists essentially of two valves 13 and 14 and a mixing chamber 12. The control unit 11 with valves 13 and 14 connects the two ring mains or loop circuits 3, 3a and 4, 4a which either allows the two components to be kept separate or to be mixed. In the molding process the components are conveyed into the mixing chamber 12 by opening valves 13 and 14 and throttling or closing the control valves 7 and 8; the components are mixed in the mixing chamber 12 and then forced upwards into the mold 15.

FIG. 2 diagrammatically illustrates on an enlarged scale a particularly advantageous embodiment of control unit 11. The control unit 11 has only a very small volume in relation to the mold 15.

Pneumatically controlled metal bellows valves are particularly advantageous as valves 13 and 14. Glandless diaphragm valves, ball valves or other valves may, however, also be used. In a particular embodiment these may consist of a piston sliding in a sealed cylinder.

The mixing chamber 12 is illustrated in FIGS. 3 and 3a. The cross-sectional area of the mixing chamber at the lower end of the inverted truncated cone is about eight to 14 times that of the inflow at the valve seats 16 and 17. It is designed at its upper edge so that the mold may be placed thereon in such a way that the joint is liquid-tight.

The mixing chamber is in its upper portion, preferably shaped like an inverted truncated cone having a half apex angle of $\beta = 3°$ to $8°$. In its lower portion it continues like a breeches pipe to the valve seats 16 and 17 of valves 13 and 14. The two legs of the breeches pipe taper into the valve seats, preferably with a conicity of 3°. The angle α which gives the inclination of the legs of the breeches pipe to the central axis of the mixing chamber 12 may be from almost 0° to 160°, preferably from 60° to 90°. However, for filling molds having special shapes it may be advantageous for the angle at which the components enter the mixing chamber to be reduced almost to 0°.

The said mixing chamber 12 does not have any undercut portions, enabling the mold 15 with the molding to be easily detached from the control unit 11 after polymerization. The contents of the mixing chamber thus remain as a sprue on the polymerized casting. There is therefore a clear separation between the unmixed (and therefore not polymerized) lactam melts downstream of the valve seats and the mixture of the two melts upstream of the valves 13 and 14 which, after polymerization, constitutes the casting including the sprue.

The outlet openings of valves 13 and 14 are of such a size that the streams of liquid can enter the mixing chamber 12 at a flow velocity of from 0.1 to 5 meters per second.

The mold 15 is located immediately above the control unit 11. For casting, the mold 15 and control unit 11 are connected to each other to form a liquid-tight joint. This may be done for example by means of gravitation or by pneumatic or mechanical pressure. Holding means which permit a rapid interchange of a plurality of identical or different molds arranged for example on a turntable are very advantageous.

It is possible to couple interchange of molds and control of valves, for example by means of a camshaft. If means are provided on the mold 15 which stop the filling process when the desired level is reached by closing valves 13 and 14 and opening the throttled or closed control valves 7 and 8, the apparatus according to the invention permits substantially automatic production.

Lactams having at least six and particularly from six to 12 ring carbon atoms are suitable for the process according to this invention and preferably caprolactam, enantholactam and capryllactam, and also capric lactam, laurolactam or C-substituted derivatives of lactams such as 3-methylcaprolactam or 4-isopropylcaprolactam. Mixtures of these lactams may also be used. The said lactams may also contain minor proportions of lactams which are connected with one another by bridging members, as for example methylene-bis-caprolactan.

In addition to generally known polymerization catalysts, alkali metal lactams (such as are described in German Pat. specification No. 1,067,587) are particularly suitable. They are used in amounts of from 0.01 to 10 percent by weight, preferably from 0.1 to 5 percent by weight, with reference to the whole weight of the polyamide-forming starting materials. Amounts outside these ranges may, however be used, for special purposes. Mixtures of these catalysts in any proportions are of course also suitable.

Known substances such as for example N-acyllactams, isocyanates, N-cyanolactams, substituted ureas, reaction products of carbamyl chlorides with heterocycles such as imidazole and the like are suitable as activators. These substances are used in amounts of from 0.05 to 10 percent, preferably from 0.1 to 5 percent, by weight with reference to the total weight of polyamide-forming starting materials.

Additives (provided their particle size is suitable for this process) may be used in the process according to this invention in the form of reinforcement materials, fillers, lubricants, delustrants or stabilizers. Examples of suitable fillers are metal powder such as aluminum powder or copper powder, slate flour and diatomaceous earth. Glass fibers or other fibers are suitable as reinforcement materials provided they are fine enough to permit closure of the valves.

The apparatus and process according to this invention may be operated in the following manner:

The amount of lactam to be polymerized is advantageously divided into two approximately equal portions and placed in the reservoirs 1 and 2. They are melted and the catalyst is dissolved with thorough mixing in one portion of the melt (reservoir 1) and the activator for the anionic lactam polymerization in the other portion of the melt (reservoir 2). It is also possible to dissolve the activator and catalyst in unequal amounts in the lactam and to regulate the mixing so that the polymerization mixture contains the calculated parts of catalyst and activator.

The choice of activator and catalyst depends on the shape of the molding to be produced, on the rate of conveyance on the pumps 5 and 6 and on the desired temperature and rate of polymerization.

Depending on the type of catalyst and activator used, their incorporation into the separate lactam melts is carried out at from 95° to 170° C, preferably from 110° to 135° C.

The melt containing activator and the melt containing catalyst pass from the reservoirs 1 and 2 into the appropriate lines 3 and 4 or the ring mains 3, 3a and 4, 4a for example by means of gravitation or by pump pressure. The lines or ring mains are previously well deaerated. The deaeration of the lines may be carried out by applying subatmospheric pressure.

The lactam melts are constantly circulated by pumping and kept at the desired polymerization temperature, which is preferably from 110° to 135° C. Heating of the reservoirs 1 and 2 for the lactam melts and of the ring main is adjusted to enable the lactam melts to enter the mixing chamber 12 at the said temperatures.

The amounts of the two lectams melts required to fill the mold are withdrawn from the two lines 3 and 4 or from the two ring mains 3, 3a and 4, 4a by opening valves 13 and 14, mixed in the mixing chamber 12 and forced into the mold 15 located above the same. It is advantageous at the beginning of the molding process to introduce the lactam melts slowly into the mixing chamber 12 at first and to increase the rate of inflow as the filling of the mold 15 proceeds. This prevents too violent an addying of the lactams melts forced through the mixing chamber 12 into the mold 15 and reliably prevents inclusion of air bubbles. At the beginning of the molding process, the pressure on the lactam melts in the two ring mains is decreased by switching off the pumps 5 and 6 and by partially or wholly opening the control valves 7 and 8 to such an extent that the rate of flow through valves 13 and 14 is not more than 0.3 meter/second, preferably only 0.2 meter/second. As soon as the mixture of lactam melts in the mold 15 has reached a height of from 70 to 130 mm, the rate of flow through valves 13 and 14 may be increased preferably to from 0.8 to 2.0 meters/second by switching on the pumps (5 and 6) and regulating the control valves 7 and 8. If necessary the flow rate may be increased to more than 4 meters/second by completely closing the check valves. A rate of flow of about 3 meters/second is particularly advantageous.

The time for filling the mold 15 should be such that actual polymerization does not start until filling is completed. The viscosity of the mixed lactam melts may be from 1 to 400 centipoises upon entry into the mold 15, but preferably from 100 to 200 centipoises.

The initiation time of the anionic lactam polymerization depends on the activator-catalyst system used and on the mixing temperature maintained. It may vary within the range from 10 seconds to 10 minutes depending on the temperature and the starting materials used and can easily be determined by a preliminary experiment. In the production of fairly large castings it is advantageous to select conditions and starting materials so that the filling time is not more than 1 minute. Moldings having a weight of 1 kg or less may also be cast in substantially shorter filling times without any great expenditure.

The air above the level of the polymerizing lactam mixture in the mixing chamber 12 and the mold 15 may be displaced by an indifferent gas such as nitrogen although this is not essential when suitable activators are used. The mold itself is heated to temperatures of from 70° to 140° C, preferably from 120° to 135° C.

The process is suitable for the production of sections which may be circular, oval, square, rectangular or prismatic, or any other shape and particularly for the production of moldings of intricate shape.

Moldings prepared by the process according to this invention are entirely devoid of air bubbles and streaks. Methods of carrying out the process according to the invention are described in greater detail in the following Examples.

EXAMPLE 1

All the valves in the apparatus according to the invention (as shown in the drawings) are closed. A mixture of 52.79 kg of caprolactam and 210 g of sodium caprolactamate is heated to 120° C in reservoir 1 and a mixture of 54.25 kg of caprolactam and 750 g of hexamethylene-1,6-bis-(carbamoylcaprolactam) is heated to 136° C in reservoir 2. Valves 9 and 10 and control valves 7 and 8 are then opened and the ring mains 3, 3a and 4, 4a are filled with the respective melts by means of pumps 5 and 6. The pumps 5 and 6 are switched off, the control valves 7 and 8 are closed and valves 13 and 14 are opened. The lactam melts pass at a speed of about 0.2 meter/second through the control unit 11 into a cylindrical mold 15 above the same which has a diameter of 70 mm and a length of 1700 mm. When the mold has been filled to a height of about 100 mm, pumps 5 and 6 are switched on again and the control valves are opened to such an extent that the rate of flow of the two melts through valves 13 and 14 is about 1 meter/second. After another 15 seconds, the mold has been filled to a height of 1,600 mm. Valves 13 and 14 are closed and the control valves 7 and 8 are completely opened.

Polymerization begins 40 seconds after valves 13 and 14 have been opened. After 1 minute, the mold is detached from the control unit 11. The finished casting may be ejected from the mold 2 minutes after commencement of the casting process.

A polycaprolactam rod having a smooth glossy surface is obtained which is completely devoid of inhomogenities and bubbles. It can be machined into any desired engineering components or other articles. The polyamide has a high molecular weight for it dissolves only incompletely in 96 percent sulfuric acid. The content of extractable constituents is about 3 percent. The modulus of elasticity of the polycaprolactam is 38,000 kp/cm$^2$.

EXAMPLE 2

Reservoir 1 is charged with a mixture of 207 kg of caprolactam and 560g of sodium caprolactamate and heated to 110° C. Reservoir 2 is charged with 217 kg of caprolactam and 3 kg of hexamethylene-1,6-bis-(carbamoylcaprolactam) and heated to a temperature of 134° C. The lactam melts are forced in the manner described in Example 1 at a flow rate of about 0.2 meter/second through the control unit 11 into a cylindrical mold having a diameter of 200 mm and a length of 1,700 mm. The mold is filled to a height of about 80 mm after about 8 seconds. The rate of flow of the 2 melts through valves 13 and 14 is then increased to about 1 meter/second and finally, after another 8 seconds, when the mold has been filled to a height of about 480 mm, to about 3 meters/second. The mold is almost full after another 8 seconds. Valves 13 and 14 are closed and the control valves completely opened.

Two minutes after the beginning of the molding process, the mold is removed from the control unit 11. The finished casting may be ejected from the mold after only 1 minute.

The casting is free from bubbles and completely homogeneous. The polyamide is only incompletely soluble in concentrated sulfuric acid and contains about 3 percent of constituents capable of being extracted with methanol.

EXAMPLE 3

A mold for the production of a marine propeller is placed on the control unit 11 of the apparatus according to this invention.

A melt of 103 kg of caprolactam and 280 g of sodium caprolactamate, heated to 100° C, is contained in reservoir 1. A melt, heated to 122° C, of 107 kg of caprolactam and 1.2 kg of hexamethylene-1,6-bis-(carbamoylcaprolactam) is contained in reservoir 2. The lactam melts are introduced into the mold in the manner described in Example 1, first at a rate of about 0.3 meter/second and later at a rate of about 3 meters/second. The mold is completely filled after about 20 seconds.

Two minutes after the commencement of casting, the mold may be removed from the control unit 11. The marine propeller may be ejected after another 3 minutes.

A bubble-free marine propeller is obtained which has a modulus of elasticity of about 35,000 kp/cm$^2$ and weighs about 40 kg.

We claim:

1. Apparatus for carrying out the process for the production of moldings by activated anionic polymerization of lactams having at least six ring carbons, in which a lactam melt containing a catalyst and a lactam melt containing an activator are separately heated to polymerization temperature and allowed to polymerize in a mold, which comprises two melt reservoirs, means associated with each reservoir for heating or cooling the melt therein, melt-agitating means in each reservoir, a control unit including a pair of valves and a vertically oriented mixing chamber, respective pipelines communicating said mixing chamber and respective reservoirs via respective valves in said control unit, valve seats for the respective valves in the wall of said mixing chamber, pumps in respective pipelines, a melt discharge opening in the upper face of said mixing chamber, a vertically oriented mold detachably mounted on said upper face directly above said chamber and in communication with said discharge opening, in which mold the united melts polymerize as a casting, and the walls of said mixing chamber being free from undercut portions, whereby the mold and the polymerized casting therein may be detached from control unit after polymerization with the contents of the mixing chamber simultaneously being removed as a polymerized sprue on said casting.

2. Apparatus as claimed in claim 1 wherein said mixing chamber has the shape of an inverted, truncated cone.

3. Apparatus as claimed in claim 1, pipe means for circulating the respective pumped melts through respective loop circuits back to the respective reservoirs, and throttle valve means in said loop circuits for throttling or closing said loop circuits when said pair of valves are open.

4. Apparatus for carrying out the process for the production of moldings by activated anionic polymerization of lactams having at least six ring carbons, in which a lactam melt containing a catalyst and a lactam melt containing an activator are separately heated to polymerization temperature and allowed to polymerize in a mold, which comprises two melt reservoirs, means associated with each reservoir for heating or cooling the melt therein, melt-agitating means in each reservoir, a control unit including a pair of valves and a vertically oriented mixing chamber, said mixing chamber having the shape of an inverted, truncated cone, respective pipelines communicating said mixing chamber and respective reservoirs via respective valves in said control unit, valve seats for the respective valves in the lower portion of said mixing chamber, pumps in respective pipelines, a melt discharge opening in the upper face of said mixing chamber, a vertically oriented mold detachably mounted on said upper face directly above said chamber and in communication with said discharge opening, in which mold the united melts polymerize as a casting, and the walls of said mixing chamber being free from undercut portions, whereby the mold and the polymerized casting therein may be detached from control unit after polymerization with the contents of the mixing chamber simultaneously being removed as a polymerized sprue on said casting.

5. Apparatus as claimed in claim 4, the cross-sectional area of the lower end of said inverted, truncated cone mixing chamber being eight to 14 times the inflow area of said valve seats.

6. Apparatus as claimed in claim 4, the wall of said inverted, truncated cone mixing chamber tapering at a half-apex angle of 3° to 8°.

* * * * *

PO-1050
(5/69)

UNITED STATES PATENT OFFICE
CERTIFICATE OF CORRECTION

Patent No. 3,752,623      Dated August 14, 1973

Inventor(s) Richard Sinn and Rolf Schellenberg

It is certified that error appears in the above-identified patent and that said Letters Patent are hereby corrected as shown below:

First page, left-hand column, ninth line, "July 14, 1971" should read -- July 16, 1971 --.

First page, left-hand column, eleventh line, insert
-- [30]    Foreign Application Priority Data
     March 2, 1968    Germany . . . . . P 17 20 352.0 --.

Column 4, line 44, "lectams" should read -- lactams --.

Signed and sealed this 27th day of November 1973.

(SEAL)
Attest:

EDWARD M. FLETCHER, JR.
Attesting Officer

RENE D. TEGTMEYER
Acting Commissioner of Patents